Dec. 9, 1924.
E. LINDERME
TIRE
Filed Feb. 18, 1924
1,518,529
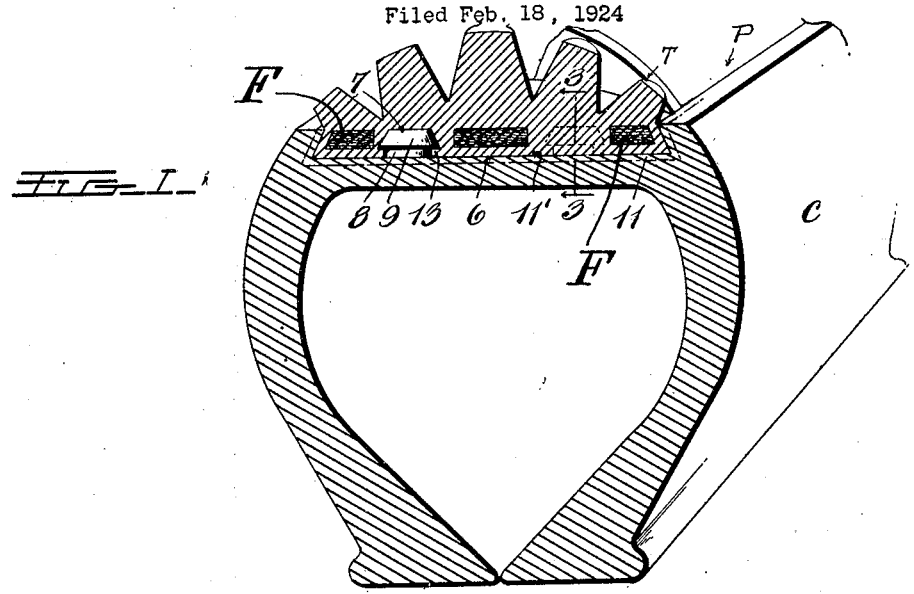
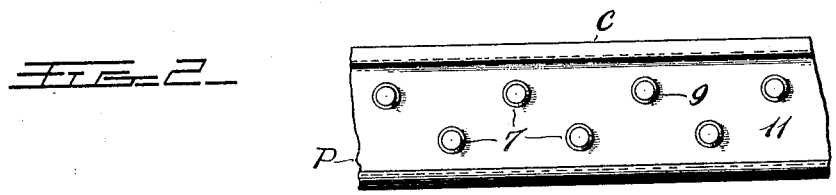
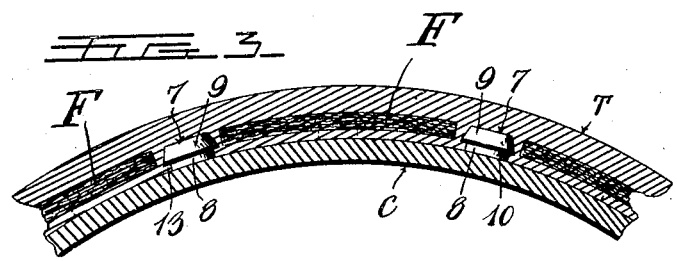
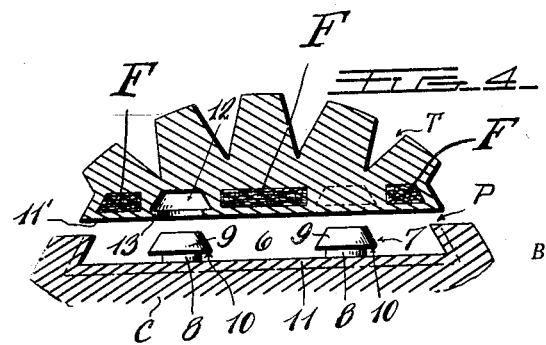
INVENTOR.
Emil Linderme.
BY John A. Bommhardt.
ATTORNEY.

Patented Dec. 9, 1924.

1,518,529

UNITED STATES PATENT OFFICE.

EMIL LINDERME, OF CLEVELAND HEIGHTS, OHIO.

TIRE.

Application filed February 18, 1924. Serial No. 693,623.

*To all whom it may concern:*

Be it known that I, EMIL LINDERME, a citizen of the United States, residing at Cleveland Heights, in the county of Cuyahoga and State of Ohio, have invented certain new and useful Improvements in Tires, of which the following is a specification.

This invention relates to improvements in tires and has for an object to provide a structure in which the tread may be readily renewed when necessary.

Another object is to provide a tire having a removable tread member so mounted as to entirely eliminate creeping as between the two members.

It is likewise an object to provide a tire having a removable tread, the two members having their contacting surfaces formed of practically pure or plain gum rubber whereby a tendency toward adhesion is created so as to prevent relative movement. The tire and tread member are provided with a novel interlocking feature which will further assist in retaining the tread upon the tire. Other objects will be in part obvious and in part pointed out hereinafter.

In order that the invention and its mode of operation may be readily understood by persons skilled in the art, I have in the accompanying illustrative drawings, and in the detailed description based thereon set out one possible embodiment of the same.

In these drawings:

Fig. 1 is a transverse sectional view of a tire constructed in accordance with my invention.

Fig. 2 is a plan view of the tire with the tread member removed.

Fig. 3 is a longitudinal sectional view of the assembled tire and tread member taken substantially on the line 3—3 of Figure 1.

Fig. 4 is a transverse sectional view showing the parts spaced apart.

Having particular reference to the drawing throughout which similar characters of reference designate similar parts, this improved tire may be stated as comprising a shoe or casing C having the usual beading to provide for attachment to a wheel rim. The peripheral portion P, however, is preferably flattened, (though thickened as usual), and is channelled, the channel 6 being under cut to more effectually retain a tread member T in position upon the tire. The bottom of the peripheral channel 6 is provided with a set of circumferentially spaced integral lugs 7, each consisting of a neck portion 8 terminating in a substantially truncated cone-shaped head 9 which incidentally forms an annular flange 10 whose function will be apparent. The entire surface 11 of the channel and the lugs is of practically pure or plain gum rubber, that is, the fabric is spaced a considerable distance below the surface so that when a tread member with a similarly formed face is arranged in contact with said surface there will be a tendency toward adhesion, with the result that creeping will be avoided.

A tread member T is provided and may have any preferred design of tread surface. The inner face 11' is flattened and widened to snugly fit within the undercut channel 6 and is formed with truncated cone-shaped recesses 12 each of which has an annular rib or lip 13, adapted as is obvious, to engage beneath the annular flange 10 carried by the head 9 in the tire channel 6. While these heads are preferably arranged in staggered relation about the periphery in order to more satisfactorily function, it is to be understood that they may be otherwise disposed. The recesses of course are similarly arranged.

As is clearly indicated in Figure 1, the fabric F in the tread member is provided with a set of openings which are of greater diameter than the recesses. The tread member is made up of rubber with no fabric other than the single layer, thereby giving it unusual yieldability, and facilitating the interlocking of the lugs and recesses, in addition to the previously stated function of creating a strong tendency toward adhesion as between the contacting surfaces of the tread and tire.

In arranging a tread member upon a tire, the structure being as just set forth, the tire is deflated and the tread member may be slipped into the channel, it being understood that there is a slight contraction of the tire and expansion of the tread to permit this action. Upon assuming its position in the channel, the lugs and recesses being interlocked and the rubber surfaces being snugly contacting, the tire is inflated in the usual manner. The result is that the shoe or casing is expanded to tightly fit the tread member. Creeping of the tread upon the shoe is impossible due to the interlocking lugs and recesses, the contacting plain or pure gum rubber faces and the close or tight fit due to inflation. Lateral shifting is entirely eliminated through the foregoing structure taken in conjunction with the under-cut formation of the channel 6 as shown.

While I have set forth certain specific structure, it is understood that certain minor changes may be resorted to as will fall within the scope of the appended claims.

I claim:

1. A tire comprising a casing having a circumferential channel in its periphery, a set of circumferentially spaced lugs arranged in the bottom of the channel, substantially truncated cone-shaped heads on the lugs, a tread member receivable in the channel and having recesses to receive said heads, and annular ribs around the recesses to form interlocking connection with the heads.

2. A tire comprising a casing having a flat circumferentially channelled periphery, said channel being undercut, a set of circumferentially spaced lugs arranged upon the bottom of said channel and disposed in staggered relation, substantially truncated cone-shaped heads formed upon the lugs, a tread member having a flat inner face provided with recesses to snugly receive the heads, inwardly directed annular ribs arranged about the recesses to engage over the truncated heads and inter-lock casing and tread member.

In testimony whereof, I affix my signature.

EMIL LINDERME.